United States Patent [19]

Von Holdt

[11] 4,085,870
[45] Apr. 25, 1978

[54] DISPENSING DRAWER ASSEMBLY

[76] Inventor: John W. Von Holdt, 6864 Lexington La., Niles, Ill. 60648

[21] Appl. No.: 739,200

[22] Filed: Nov. 5, 1976

[51] Int. Cl.$^2$ .......................................... G01F 11/18
[52] U.S. Cl. ................................................ 222/361
[58] Field of Search ............... 222/284, 361, 336, 322, 222/284, 436, 288

[56] References Cited

U.S. PATENT DOCUMENTS

| 847,000 | 3/1907 | Helmhold | 222/361 X |
| 1,939,900 | 12/1933 | Jagy | 222/361 X |
| 2,237,189 | 4/1941 | McCormack et al. | 222/361 X |
| 2,603,386 | 7/1952 | Barnes | 222/361 X |
| 3,347,425 | 11/1967 | Beuschausen | 222/361 X |
| 3,458,092 | 7/1969 | McConnell | 222/361 |

FOREIGN PATENT DOCUMENTS 8,723 of 1895 United Kingdom ................. 222/284

Primary Examiner—Stanley H. Tollberg
Attorney, Agent, or Firm—Charles F. Pigott, Jr.

[57] ABSTRACT

The following specification describes a dispensing drawer assembly having a housing in which a passage is formed to permit material in a container to fall upon a bridge wall spaced from the passage. The periphery of the passage is sealed by spaced partition walls of the drawer when in the closed position and metering walls between the partition walls are optionally broken out to control or select the quantity of material deposited on the bridge wall.

On movement of the drawer to an open position, the rear partition wall scrapes the selected quantity of material on the bridge wall through a passage for capture by a container, while a top closure wall on the drawer seals the passage to prevent the entrance of contaminants into the container.

6 Claims, 6 Drawing Figures

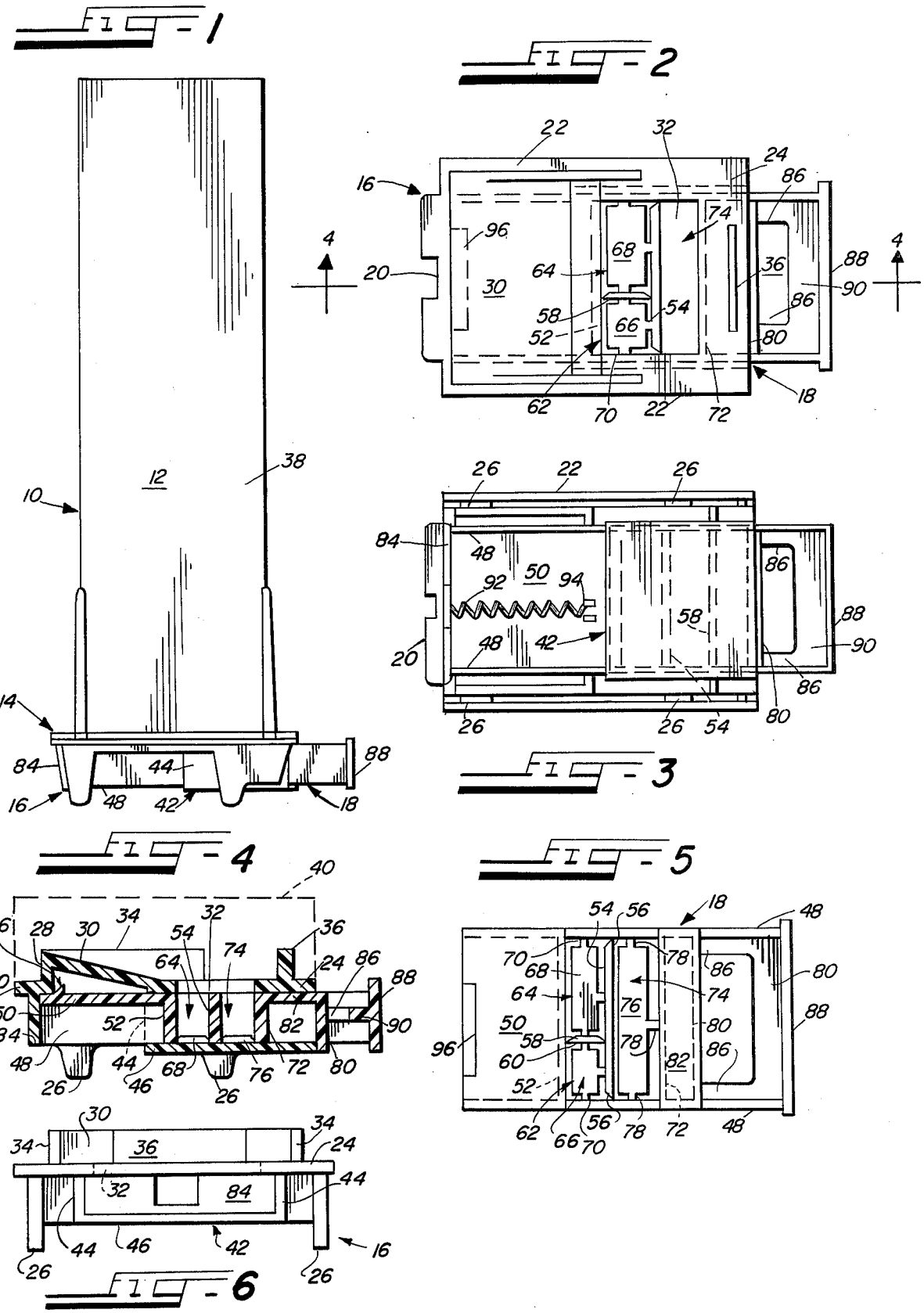

DISPENSING DRAWER ASSEMBLY

BACKGROUND OF THE INVENTION

1. Field of the Invention

This invention relates in general to dispensing devices and more particularly to a dispensing drawer assembly of improved sealing character and versatility for use in a dispensing assembly.

2. Summary of the Prior Art

Dispensing assemblies for supplying a quantity of powder or granular material for dissolution in a measured quantity of water have achieved considerable popularity as a quick, facile and economical arrangement for food or beverage preparation. The dispensing assemblies have therefore found wide application in vending machines, factories, public places and even in homes. The materials dispensed include a large range or variety of items such as boullion, juice or beverage flavors and even medicinal pills.

The materials may therefore be powdered, granular or particulate and range in their ability to withstand moisture or other contaminants. The use of any of the terms powdered, granular or particulate shall be understood to include each of the others and materials of similar consistency or form.

The usual dispensing assembly of the type described above includes a hopper or container having a drawer assembly at the bottom. The material in the container passes onto a bottom wall of the drawer assembly housing. A drawer nested between the top and bottom wall of the housing scrapes the material from the bottom wall on movement of the drawer from a closed to an open position. The quantity of material in the drawer becomes accessible for use by placement of a container below the drawer and capturing the material scraped from the bottom wall as it passes the wall edge. The drawer is usually spring biased to a normally closed position and in the case of vending machines may only be released after the deposit of the proper amount of money or coins, but as this forms no part of the present invention it will not be discussed further and in many instances the material may be dispensed free.

In any event the usual construction of the drawer is to simply provide side walls nestingly received between side walls of the housing for longitudinal movement along the side walls of the drawer housing while a transverse or partition wall extending between the side walls of the drawer scrapes the material from the bottom wall of the housing. As the partition wall moves, material may move both around the top and bottom edges thereof, so that no definite or certain amount is dispensed and no seal is provided to protect the contents.

A further problem with the described arrangement is that no convenient means for metering or limiting the quantity of material dispensed are provided so that considerable waste may result. Thus if less than the normally dispensed quantity of material is desired, a disposal problem is presented to the user. This in turn can result in dissatisfaction and/or an unsightly condition, if care is not used in disposing of the excess material. A front door is usually provided on the drawer for engagement with the front wall of the housing when the drawer is closed. This engagement is loose however and during movement to the open position, no seal is provided for preventing the entrance of air or the intentional introduction of contaminants into the container. The entrance of humid air, of course, encourages the growth of harmful organisms. It is therefore most important to protect the contents from the introduction of contaminating material such as air.

SUMMARY OF THE INVENTION

The present invention creates a number of improvements in the construction and operation of the dispensing drawer assembly for use in a dispensing assembly of the type described by providing spaced walls on the drawer which create a peripheral seal about the material on the bottom or back wall of the container drawer assembly housing when the drawer is closed. A top wall for the drawer sealingly engages a passage in the drawer assembly housing and cooperates with the spaced walls to prevent contamination of the container contents during the movement of the drawer from a closed to an open position and seals the passage thereafter.

Additionally the space between the drawer partition walls is provided with a plurality of walls creating separate compartments or chambers. Any selected wall between the front and back partition walls may be facily and optionally broken out since they are secured only by breakable thin flanges to enable a desired or metered quantity of material to be disposited from the container onto the housing back wall for dispensation by the drawer when it is moved to an open position. Thus the quantity dispensed is known and if a large volume is desired, the drawer may be repeatedly operated or on the other hand, if less than the total volume that can be dispensed is desired, the drawer may be suitably arranged easily.

It is therefore one object of the present invention to provide an improved dispensing drawer assembly.

It is another object of the present invention to provide a dispensing drawer assembly having an improved seal arrangement.

It is still another object of the present invention to provide a dispensing drawer assembly having the capacity for dispensing a measured or metered quantity of material.

Other objects and features of the present invention will become apparent on the examination of the following specification and claims together with the accompanying drawings.

BRIEF DESCRIPTION OF THE DRAWINGS

FIG. 1 is a side elevational view of a dispensing assembly including a dispensing drawer assembly incorporating the principles of the present invention.

FIG. 2 is a top elevational view of the dispensing drawer assembly.

FIG. 3 is a bottom elevational view of the dispensing drawer assembly seen in FIG. 2.

FIG. 4 is a sectional view of the drawer shown in FIG. 3 taken generally along the line 4—4 in FIG. 3.

FIG. 5 is a top elevational view of the drawer; and

FIG. 6 is a front elevational view of the housing.

DESCRIPTION OF THE PREFERRED EMBODIMENT

In FIG. 1 a dispensing assembly incorporating the principles of the present invention is indicated by the reference character 10. The dispensing assembly 10 includes a plastic or paper carton container 12 having a closed top end and a dispensing drawer assembly 14 at the lower end for receiving and dispensing the contents of container 12.

The dispensing drawer assembly 14 comprises an integrally formed plastic support housing 16 and an integrally formed plastic dispensing drawer 18. The support housing 16 includes a rear flange wall 20, spaced side flange walls 22 and front flange wall 24. Flange walls 20, 22 and 24 are located in a common generally horizontal plane. Support and mounting walls or legs 26 project downwardly from each side wall 22 for conventionally mounting or supporting the dispensing assembly 10 in a suitable mounting frame or the assembly 10 may be supported in any other manner conventional in the art.

A rear vertically upwardly extending wall 28 is provided for the rear wall 20 as best seen in FIG. 4. A planar wall 30 at the upper end of wall 28 sloping downwardly and forwardly from the upper end of wall 28 extends toward the plane of horizontal walls 20, 22 and 24. Wall 30 terminates in a horizontal front portion coplanar with walls 20, 22 and 24 spaced from the front wall 24 to define an opening or passage 32 for passing the contents of the container 12.

Opposite side edges of wall 30 are integrally interconnected with planar walls 22 by upwardly extending vertical walls 34 which extend forwardly past the end of wall 30 and past the midportion of the passage 32. A front vertically upwardly extending wall or projection 36 is also provided for the front flange wall 24 and each of the vertically upwardly extending walls 28, 34 and 36 serves to nestingly receive or engage respective interior portions of the peripheral rectangularly shaped wall 38 of container 12. A flange wall may also be provided at the lower end of container wall 38 for adhesive engagement with the upper surface of a respective flange wall 20, 22 and 24 on assembly of the container to the dispensing drawer assembly 14. Additional upwardly extending flange walls indicated by dashed lines 40 in FIG. 4 may also be integrally formed along the outer margins or edges of walls 20, 22 and 24 for engaging the exterior surface of a paper carton having a plastic bag therein and adhesively secure to the housing 16. In either event the contents of the container 12 simply flow downwardly through the opening 32 guided by the sloping wall 30 of the housing 16.

The drawer 18 is supported below the housing planar flange walls 20, 22 and 24 by a depending or inverted bridge 42 comprising a pair of spaced side walls 44 spaced inwardly of the support legs 26 and adjacent a respective side edge of a passage 36. Side bridge walls 44 are interconnected at their lower ends by a bridge wall 46. The side walls 44 and the bridge wall 46 extend from a position to the rear of the rear edge of passage 32 to a position adjacent the front edge of front wall 24 to define an exit passage at the front end of the housing 14. The walls 44 and 46 nestingly receive and slidingly engage respective spaced elongate side walls 48 of the drawer 18.

The side walls 48 of the drawer 18 are integrally interconnected along their top edges by a top planar closure wall 50. Wall 50 extends from the rear end of walls 48 to a position adjacent the rear edge of passage 36 underlying the horizontal portion of wall 30. Planar top closure well 50 is dimensioned for closing passage 36, when the drawer 18 is opened. When the drawer 18 is closed the front of wall 50 is located behind the rear end of passage 32 for opening the passage 32.

A first vertical partition wall 52 extends downwardly from the front edge of wall 50 to the upper surface of bridge wall 46. Partition or scraper wall 52 extends between the side walls 48 so as to correspond to the width of passage 32. Spaced forwardly of wall 52 is an optional partition or metering wall 54 parallel to wall 52 and extending toward each side wall 48 at a position substantially midway between the front and rear edges of passage 32. Wall 54 is interconnected with the drawer side wall 48 by means of thin breakable flanges 56.

Another optional metering or partition wall 58 having breakable flanges 60 interconnecting wall 58 with walls 52 and 54 extends transversely between walls 52 and 54 at a position offset from the central axis of the walls 52 and 54 to form a part of metering chambers 62 and 64 of differing volume or cross sectional area as best seen in FIG. 5 directly below the rear half of passage 32. A respective optional bottom metering wall 66 and 68 of size corresponding to the respective cross sectional area of the chambers is provided for each chamber 62 and 64. Each bottom wall 66 and 68 is connected by means of breakable thin flanges 70 to the adjacent walls adjacent the bottom edge of the adjacent walls. The bottom walls 66 and 68 therefore engage the upper surface of the bridge wall 46 intermediate the partition walls 52, 54 and 58 to capture material in chambers 62 and 64 relatively and prevent the deposit of the material on the bridge wall 46 and its dispensation when the drawer is opened.

A front partition wall 72 spaced forwardly of the partition wall 54 and just forwardly of the front edge of passage 32 is also provided between the drawer side walls 48 to define a third metering chamber 74 between partition walls 54 and 72. The volume of chamber 74 is equal to the total volume of chambers 62 and 64 to provide convenient doubling of the dispensed material, if desired. A bottom metering wall 76 located adjacent the upper surface of bridge wall 46 is also connected between the drawer side walls 48 and partition walls 54 and 72. Metering wall 76 is supported on the adjacent walls by means of breakable flanges 78. The front and rear partition walls 72 and 52 are spaced apart by a distance corresponding to the total length of passage 32 so that the contents of the container 12 corresponding to the volume of chambers 62, 64 and 74 may be deposited upon the bridge wall 46, when each of the bottom metering walls 66, 68 and 76 are broken out at the respective flanges to permit each chamber to communicate passage 32 with bridge wall 46. The contents deposited on the bridge wall 46 are scraped therefrom for dispensing through the broken out bottom walls 66, 68 and 76, when the drawer 18 is opened.

A front stop wall 80 extending below the partition walls and bridge wall 46 is provided between side walls 48 of the drawer at a position spaced forwardly of the front partition wall 72. Wall 80 is interconnected at its top edge with the top edge of wall 72 by a planar horizontal wall 82 and engages with the front edge of wall 46. The rear end of side walls 48 or wall 50 can simultaneously engage a depending rear wall 84 on the rear flange wall 20, when the drawer is in closed position.

Planar horizontal side walls 86 extend forwardly from wall 80 along the drawer side walls 48 and intermediate the top and bottom edges of walls 48. Walls 86 and 48 therefore project forwardly of housing 14 to a front vertical pull wall 88. A planar horizontal connecting wall 90 interconnects walls 86 with each other and with wall 86 to rigidify the projecting pull portion of drawer 18 and enable the facile manipulation of the drawer 18 to either an open or closed position.

In addition a coil spring 92 is connected, if desired, between the depending rear wall 84 and lugs 94 depending from the bottom surface of closure wall 50. Spring 92 serves to bias the drawer 18 to its closed position and places retaining force on the opening movement to facilitate control. Lip 96 stops the open drawer.

The container 12 and the drawer assembly 14 are usually assembled by a vendor to contain any one of a wide variety of materials, such as, but not limited to, powdered coffee, soup, beverage flavoring or even medicinal pills. Thus a wide variety of materials are contemplated for dispensation from the container and these need not be limited to materials for human consumption.

In any event the quantity of material dispensed on each drawer opening may depend on a wide variety of factors including the taste of the user and therefore either the vendor or the user may break out one or more of the bottom walls 66, 68 and 76 and the intermediate partition wall 54 if so desired by the application of a small manual force to the selected walls for fracturing the respective flanges. The drawer is then assembled to the housing by simply inserting the same through the passage defined by the bridge 42, after providing suitable communication between the container and passage 32.

Thus by breaking out the elongate metering wall 76 a selected or corresponding volume of material passing through the passage 32 drops upon the bridge wall 46. Likewise if wall 66 is additionally broken out the volume of material on wall 46 is increased by a corresponding increment. If wall 68 is additionally or alternatively broken away, a corresponding volume of material from container 12 is deposited on the bridge 46. Thus if walls 66, 68 and 76 are broken out the material deposited on wall 46 is double the quantity of volume dispensed if only wall 76 is broken out. Thus by selecting which one or ones of the metering walls are broken out, a corresponding quantity of material may be selected for dispensation. Repeated operation of the drawer permits multiples of any selected volume to be conveniently dispensed. For pill dispensing only the small chamber 62 may, for example, be used and therefore only a number of pills corresponding to the small chamber size falls on wall 46 for dispensation. If larger pills or a larger number of pills are required one of the other chambers may be used instead.

When the drawer 18 is assembled to the housing 16, the upper edges of the front and rear partition walls 72 and 52 together with the drawer side walls 48 engage against the lower planar surface portion of walls 30, 22 and 24, while the lower edges engage wall 46 to seal the passage 32 from the ingress of moist air or the artificial injection of contaminating matter. Material in the container 12 is, of course, deposited from passage 32 onto bridge wall 46 through any of the broken out bottom walls 66, 68 or 76, however contact with that material is also prevented for the same reason. The amount of quantity of material on the bridge wall 46 corresponds to the known or desired quantity as previously explained.

When the drawer 18 is operated to an open position, a cup or other container such as the open palm is held below the drawer at the front of housing 16. As the drawer is opened the partition wall 65 or the partition wall 52 if wall 54 has been removed, scrapes the material from the bridge 46 through the passage formed at the front of the housing by the bridge 42 and the material is deposited into the container. During the movement the seal is retained between the front and rear partition walls of the front wall 24 and bridge wall 46 and behind the rear partition wall by the top closure wall 50. When the front partition wall 72 exits from between wall 24 and the bridge 42 the material in chamber 76 is deposited and wall 50 has already closed passage 32. The amount of material deposited is, of course, controlled by the number or selection of which ones of the bottom metering walls are broken out or alternatively the drawer may simply be opened only as far as partition wall 54. Any retained bottom wall 66, 68 or 76 simply retains the material which passes through the bridge passage and is returned as will be explained. Indicia provided at the front of the container or housing provides information on the proper operation.

On movement of the drawer to the open position the top closure wall 50 passes below passage 32 and as already mentioned the front and rear partition walls 72 and 52 maintain the seal. When partition wall 72 clears wall 24, wall 50 has completely closed passage 32. A seal is therefore maintained during movement of the drawer by walls 48, 50, 52 and 72 and in the fully open position of the drawer by the top closure wall 50. This prevents the entrance of moisture or contaminants, as the seal is maintained in all drawer positions. Lip 96 adjacent the rear end of closure wall 50 engages the rear edge of the horizontal wall portion of wall 30 to limit or stop the drawer 18 in the open position with the rear edge of chambers 62 and 64 closing the front wall 24.

Wall 50 thus also prevents material from being deposited on the bridge wall 46 through passage 32, which material might interfere with drawer closure. Reverse or closure movement of the drawer 18 simply returns the drawer to a closed position and the rear partition wall 52 scrapes any contaminant that may be slipped onto the wall 46 at the rear of bridge 42. Any material contained in a closed metering chamber 62, 64 or 74 is therefore simply returned with the drawer to a position within the housing 16.

It will be appreciated that release of the drawer for movement to the open position may be controlled in any well known manner in the event the assembly 10 is intended for use in a vending machine or similar device.

The foregoing constitutes a description of a preferred embodiment of the invention, however, the invention is not believed limited to the described embodiment but is believed capable of wide modification and numerous variations as set forth in the appended claims.

What is claimd is:

1. A dispensing drawer for use in a dispensing drawer assembly having a wall spaced from a passage transmitting material from a container for deposit on said wall and thereafter movable by said drawer from said wall for dispensing the material in response to the movement of the drawer to an open position, the improvement comprising: means carried by said drawer for selecting the volume of material deposited on said wall, said volume selecting means including a plurality of chambers with at least one of said chambers having a removable metering wall, said removable metering wall having its major plane extending transverse said passage to capture material in the metering wall chamber and prevent passage of the material past said metering wall; and frangible means coupling said metering wall to the walls defining the metering wall chamber, whereby said metering wall may be removed by breaking said frangible means.

2. A dispensing drawer as described in claim 1, said dispensing drawer comprising an integrally formed plastic part and said frangible means comprising a plurality of fingers coupling said metering wall to the walls defining the metering wall chamber.

3. A dispensing drawer as described in claim 1, said plurality of chambers including a first chamber, a second chamber of different size than said first chamber and a third chamber having a size equal to the total size of said first and second chambers.

4. A dispensing drawer as described in claim 3, wherein each of said chambers has a removable metering wall.

5. A dispenser drawer assembly for a container carrying a material adapted to be dispensed through said assembly, the improvement comprising: a housing for engagement with said container and having a passage for transmitting material in said container; a receiving wall spaced from said passage for receiving material transmitted by said passage; a drawer received by said receiving wall and passage and operable between a rearward closed position and a forward open position for moving material from between said receiving wall and passage to dispense said material, said drawer including a top closure wall for sealing said passage when said drawer is in its forward open position, said drawer being constructed to block said passage when said drawer is in its forward open position and to allow transmission of material to said receiving wall when said drawer is in its rearward closed position; means normally biasing said drawer to its rearward closed position; means carried by said drawer for selecting the volume of material deposited on said wall, said volume selecting means including a plurality of chambers with at least one of said chambers having a removable metering wall, said removable metering wall having its major plane extending transverse said passage to capture material in the metering wall chamber and prevent passage of the material past said metering wall; frangible means coupling said metering wall to the walls defining the metering wall chamber, whereby said metering wall may be removed by breaking said frangible means; and grasping means for enabling an operator to pull said drawer manually from its rearward closed position to its forward open position.

6. A dispensing drawer assembly as described in claim 5, said dispensing drawer comprising an integrally formed plastic part and said frangible means comprising a plurality of fingers coupling said metering wall to the walls defining the metering wall chamber.

* * * * *